United States Patent [19]
Mufford et al.

[11] Patent Number: 5,991,670
[45] Date of Patent: *Nov. 23, 1999

[54] POWER CONTROL SYSTEM FOR A FUEL CELL POWERED VEHICLE

[75] Inventors: W. Edward Mufford, Langley; Douglas G. Strasky, Parksville, both of Canada

[73] Assignee: dbb Fuel Cell Engines GmbH, Nabern, Germany

[ * ] Notice: This patent is subject to a terminal disclaimer.

[21] Appl. No.: 08/778,498

[22] Filed: Jan. 3, 1997

Related U.S. Application Data

[63] Continuation-in-part of application No. 08/581,312, Dec. 29, 1995, Pat. No. 5,771,476.

[51] Int. Cl.$^6$ ........................................... H01M 8/10
[52] U.S. Cl. ..................... 701/22; 180/65.1; 180/65.3; 429/19
[58] Field of Search ............................ 701/22; 180/65.1, 180/65.3; 429/19

[56] References Cited

U.S. PATENT DOCUMENTS

| | | | |
|---|---|---|---|
| 4,489,242 | 12/1984 | Worst | 307/10 R |
| 4,923,768 | 5/1990 | Kaneko et al. | . |
| 5,366,821 | 11/1994 | Merritt et al. | . |
| 5,434,015 | 7/1995 | Yamada et al. | 435/240 |
| 5,434,016 | 7/1995 | Benz et al. | . |
| 5,482,790 | 1/1996 | Yamada et al. | 429/9 |
| 5,532,573 | 7/1996 | Brown et al. | 322/22 |
| 5,646,852 | 7/1997 | Lorenz et al. | 701/22 |
| 5,662,184 | 9/1997 | Riemer et al. | 180/65.1 |
| 5,678,647 | 10/1997 | Wolfe et al. | 180/65.3 |
| 5,771,476 | 6/1998 | Mufford et al. | 701/22 |

OTHER PUBLICATIONS

"Ballard PEM Fuel Cell Powered ZEV Bus", SAE Technical Paper Series, No. 931817, pp. 113–20, Howard et al., 8/93.
"Ballard Zero Emission Fuel Cell Bus Engine", the 12th International Electric Vehicle Symposium (EVS–12), vol. 1, Sessions 1A–2D, Poster Sessions, Howard, Dec. 1994.

*Primary Examiner*—William A. Cuchlinski, Jr.
*Assistant Examiner*—Olga Hernandez
*Attorney, Agent, or Firm*—McAndrews, Held & Malloy, Ltd.

[57] ABSTRACT

A control system interrelatedly controls the electric power output and oxidant supply in a fuel cell electric power generation system. The power generation system comprises at least one fuel cell stack, and a plurality of electrical loads powered by the fuel cell stack, including an electric traction motor for propelling the vehicle, and a compressor for delivering oxidant gas to the fuel cell stack. The electric power output of the at least one fuel cell stack is dependent on the compressor speed. The control system comprises a summing device for determining the total instantaneous power demand of the electrical loads based on a plurality of sensed power demand signals, and a processor for generating a feed-forward output signal for adjusting the compressor speed to a value predicted to give fuel cell power output sufficient to satisfy the instantaneous power demand.

18 Claims, 9 Drawing Sheets

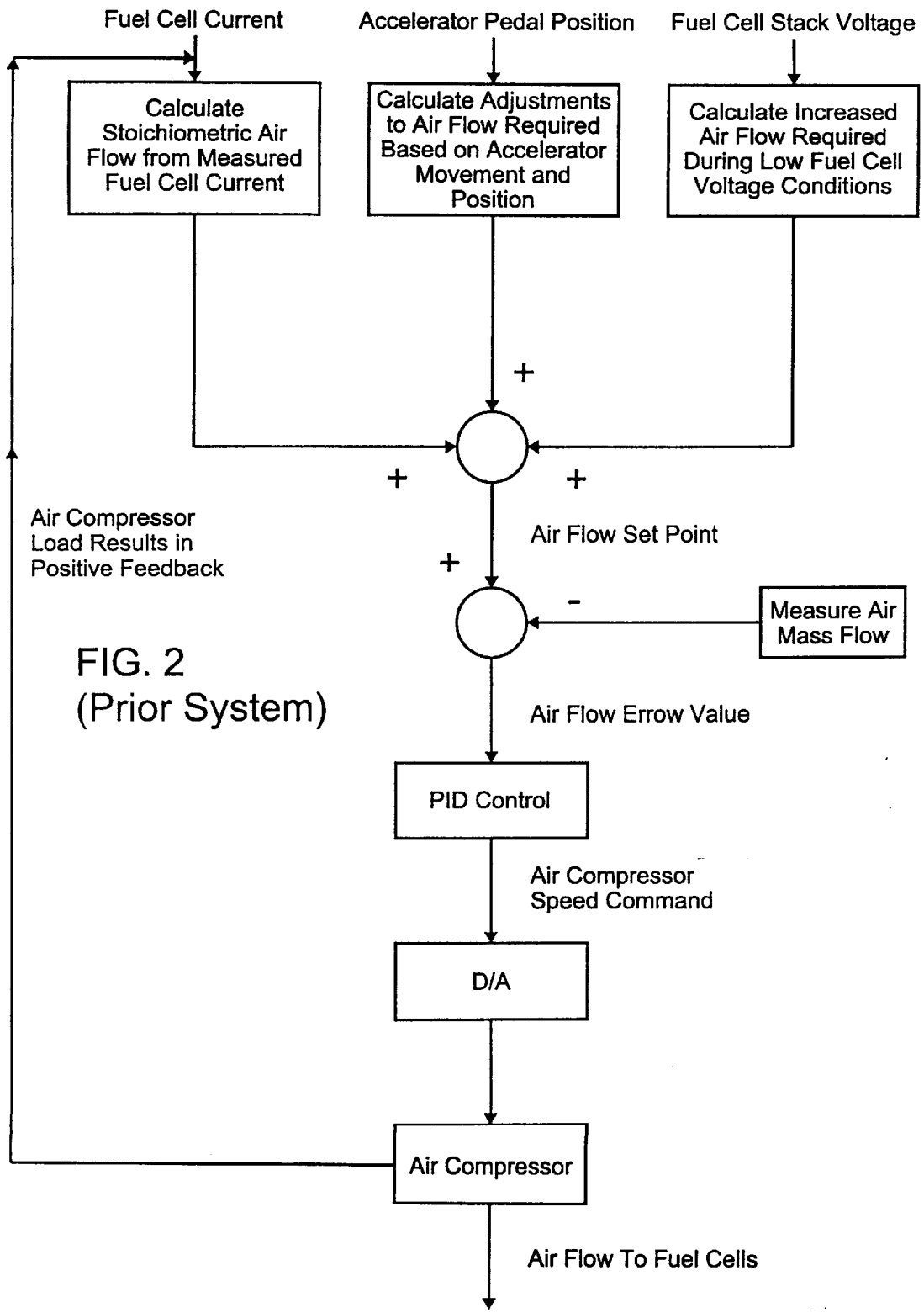
FIG. 2 (Prior System)

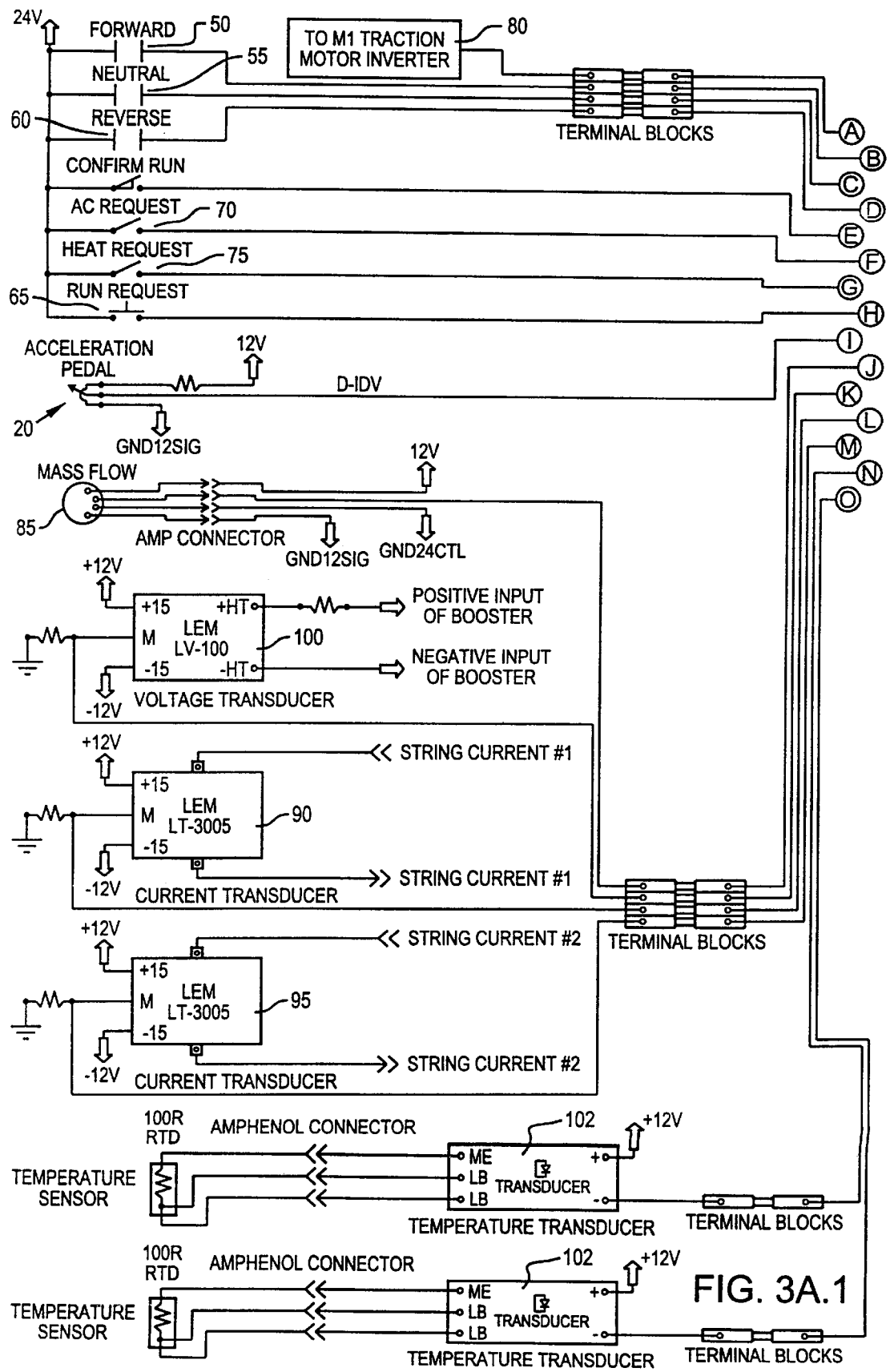
FIG. 3A.1

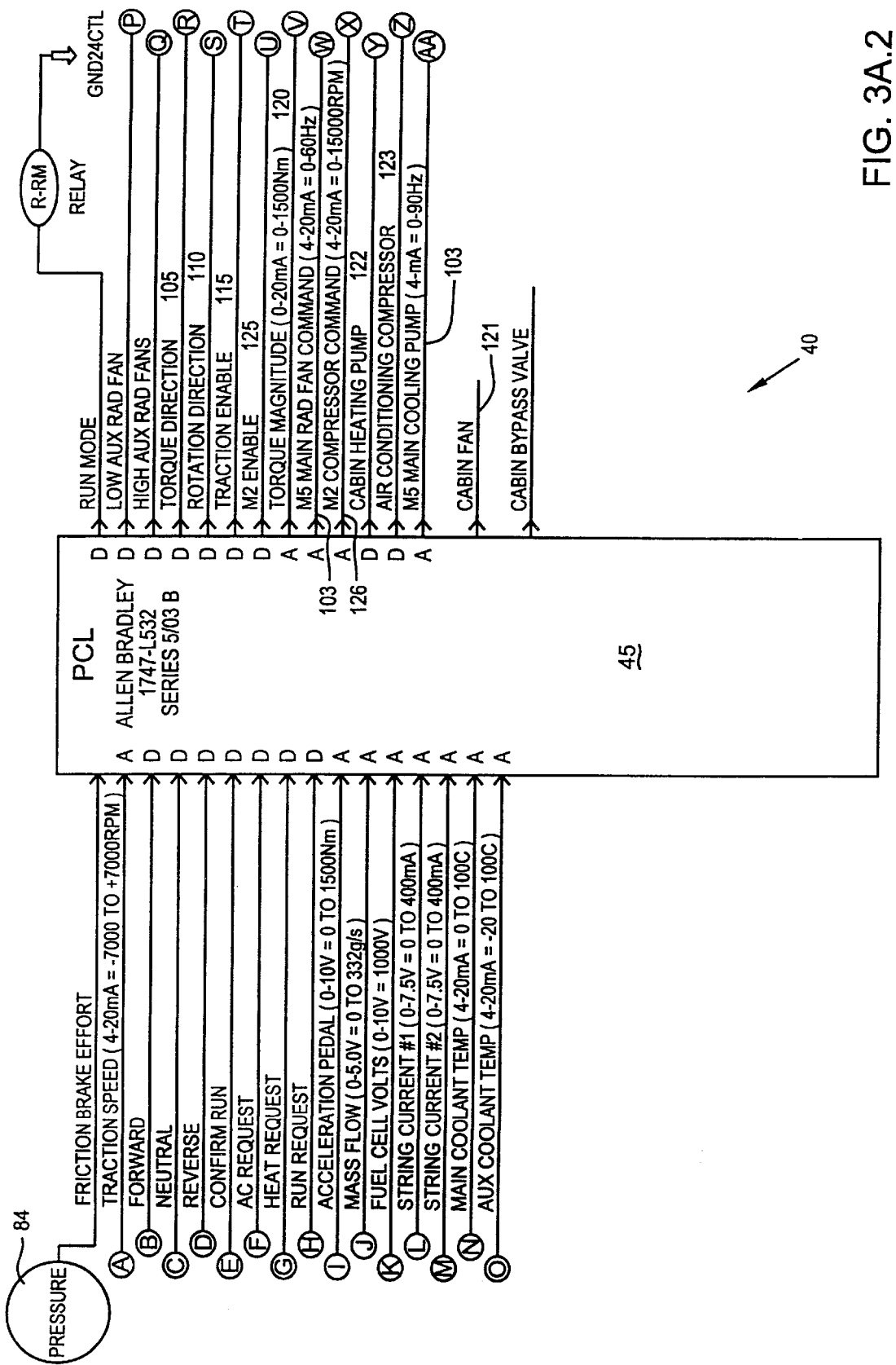
FIG. 3A.2

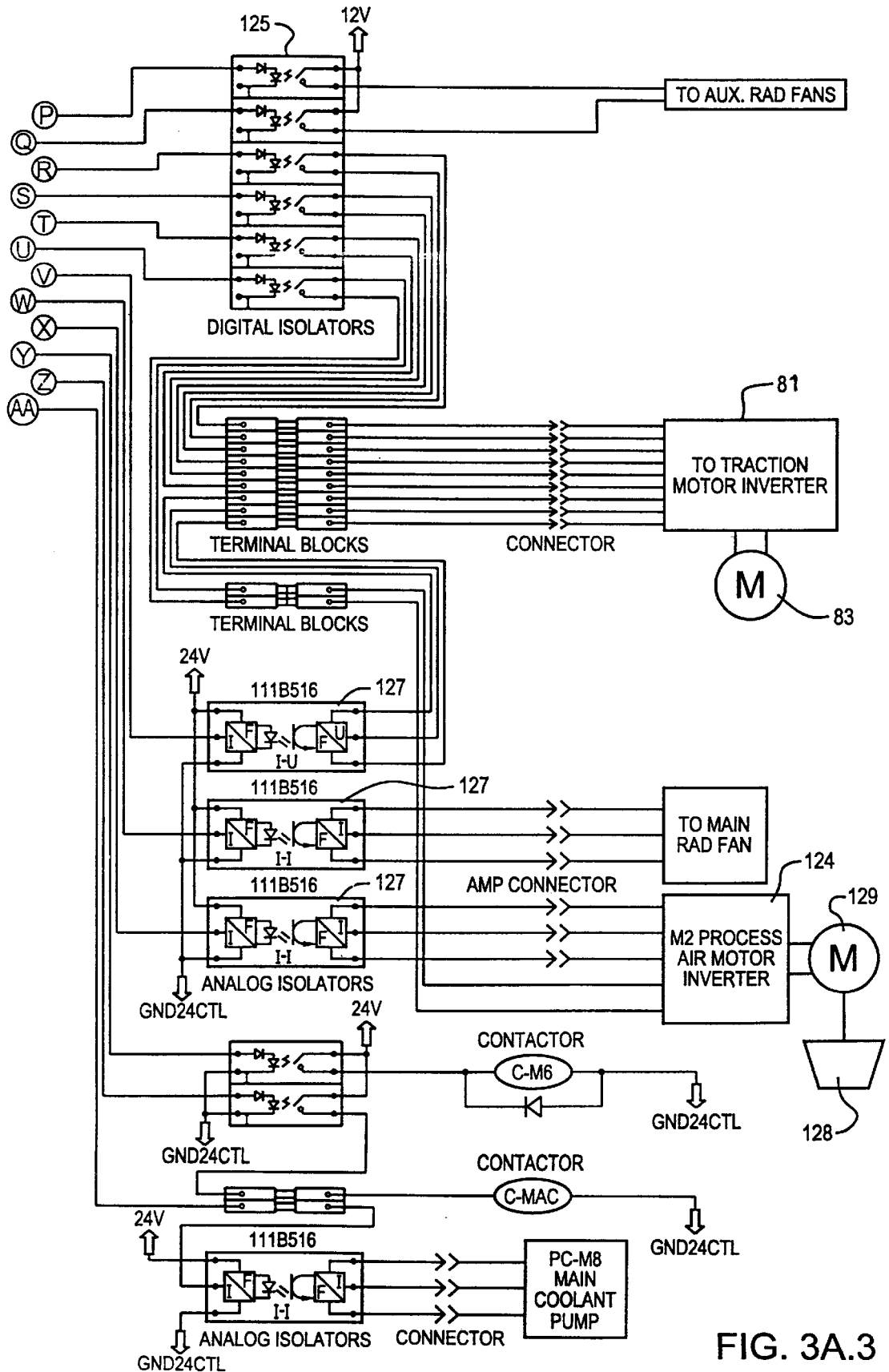
FIG. 3A.3

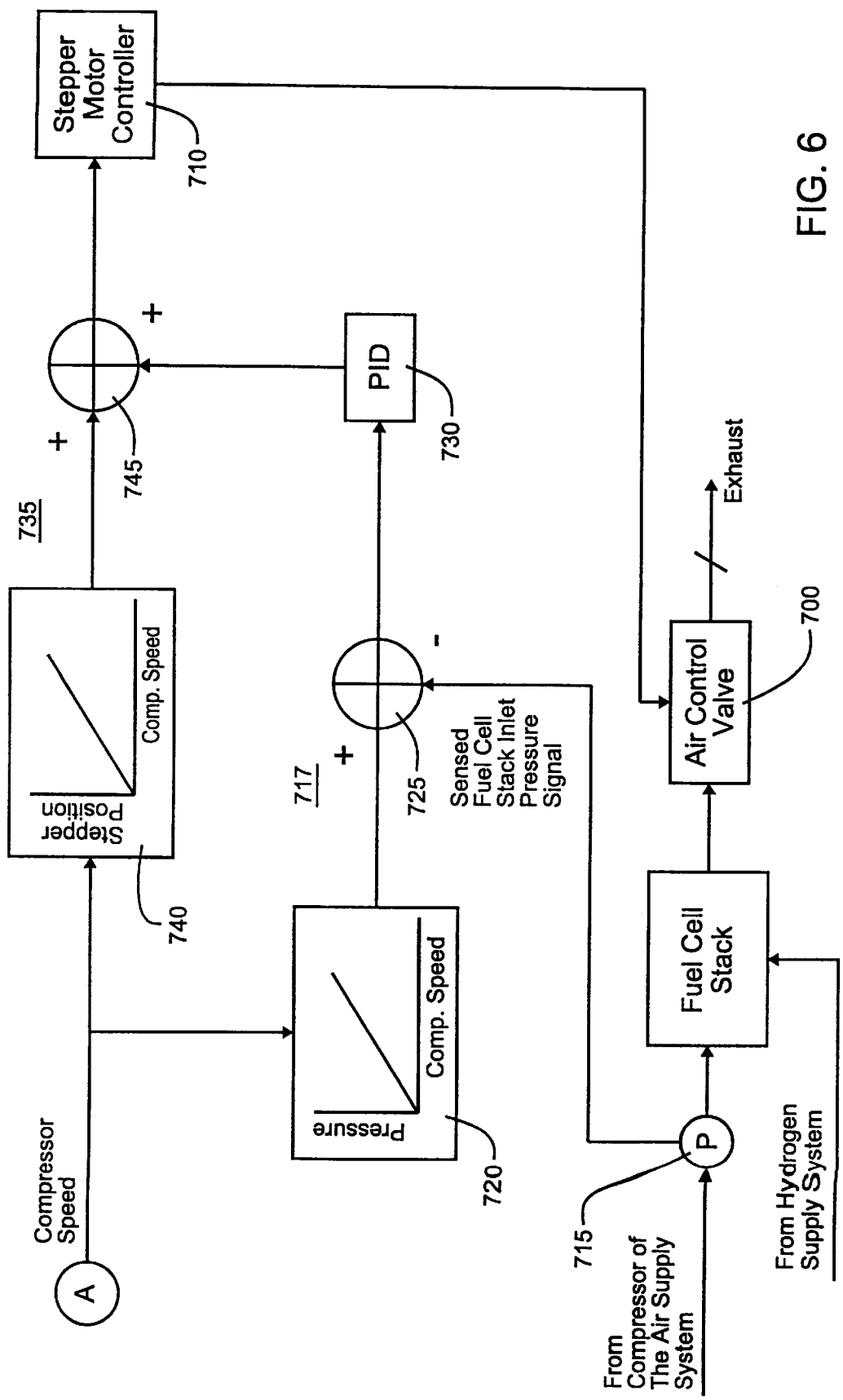

POWER CONTROL SYSTEM FOR A FUEL CELL POWERED VEHICLE

CROSS-REFERENCE TO RELATED APPLICATION

This application is a continuation-in-part of U.S. patent application Ser. No. 08/581,312 filed Dec. 29, 1995, now U.S. Pat. No. 5,771,476 issued Jun. 23, 1998, entitled "Power Control System For A Fuel Cell Powered Vehicle".

FIELD OF THE INVENTION

The present invention relates to a power and reactant supply control system for a fuel cell electric power generation system. More particularly, the present invention relates to a fuel cell powered vehicle having integrated control of fuel cell power output and fuel cell oxidant supply.

BACKGROUND OF THE INVENTION

Internal combustion engines have contributed greatly to the advancement of society. Vehicles powered by these engines have shortened the travel times between us by making long distance road travel routine. Such engines, however, have also greatly contributed to the pollution of our environment. The combustion of petroleum products in these engines results in unwanted byproducts such as carbon monoxide, carbon dioxide, sulfur dioxide, nitrogen dioxide, etc., that are dumped into our atmosphere.

Vehicles powered by alternative energy sources are under development. One such alternative energy source is the fuel cell. Fuel cells, for example, generate electrical power through electrochemical reaction of a fuel and oxidant, such as for example, hydrogen and oxygen. The electrical power that is generated is used to drive an electric traction motor that, in turn, drives the wheels of the vehicle. The product of the electrochemical reaction in a fuel cell utilizing hydrogen and oxygen is water, a product which is easily disposed of.

FIG. 1 illustrates one embodiment of a hydrogen and oxygen supply for a fuel cell stack that, for example, is used to power an electric vehicle. The oxygen for the fuel cell reaction can typically be obtained from the ambient air while the hydrogen is obtained, for example, from a hydrogen fuel tank, a hydrogen storage device, or in a reformate stream from a catalytic reformer. The hydrogen and air for the fuel cell stack are handled by respective air and hydrogen supply systems that are each under the control of, for example, a programmable logic controller (PLC).

The power available from the fuel cell stack must be adjusted to meet, as far as possible, the power required to run the various electrical loads of component systems of the vehicle (for example, in addition to the traction motor, loads may include air conditioning equipment, lights, pump motors, etc.). The fuel cell reaction, and, thus, the available output power from the fuel cell stack, may be controlled by regulating the air mass flow from the air supply system through the stack.

A fuel cell based electric power generation system with an improved reactant supply and control system is described in U.S. Pat. No. 5,366,821, which is incorporated herein by reference in its entirety. In particular, U.S. Pat. No. 5,366,821 describes a system in which the reactant pressure, mass flow, utilization ratio and the temperature may be regulated, independently or interrelatedly, to increase net fuel cell power output under fluctuating load conditions. In a preferred embodiment of the system, a receiver is used to dampen pressure fluctuations, and to store and provide additional reactant to the fuel cell as needed, during periods of fluctuating power demand.

In a fuel cell powered vehicle, the air supply system needs to respond rapidly to highly and rapidly varying power demands, but because of space constraints it is undesirable to employ an air receiver in the system.

In the system illustrated in FIG. 1, the air flow is under the control of a compressor within the air supply system. The compressor, in turn, is under the control of the PLC and appertaining circuitry used to control the speed of the compressor based on various sensed input signals. These sensed input signals include the measured air mass flow of the air supplied to the fuel cell, as measured by sensor 10 of FIG. 1, the current output from the fuel cell stack, as measured by current sensor 15, the voltage output of the fuel cell stack, as measured across output leads 20, and accelerator pedal movement and position, as measured by system 25.

One manner in which the PLC can use the foregoing input signals to control the illustrated system is set forth in FIG. 2. As would be understood by those skilled in the art, the PLC performs the illustrated steps and functions under a combination of hardware and software control.

The PLC accepts the sensed fuel cell current value and calculates the air mass flow that is needed to provide the power required by the loads from the fuel cell stack based on the sensed current value. Additionally, the PLC determines whether changes to the air mass flow are needed as a result of changes in the accelerator pedal position and to what degree such changes are required. Still further, the PLC determines whether an additional increase in air mass flow is required as a result of a low voltage condition of the fuel cell stack based on the measured fuel cell stack voltage. The results of these three calculations are summed and are compared to the measured air mass flow to generate an error signal. This error signal is processed, for example, using a PID (proportional-integral-derivative) control, such a control being understood and readily implemented by those skilled in the design of control systems. PID processing results in an output correction signal value that, for example, may be converted to an analog signal by an digital-to-analog converter, that is supplied to control a mechanism, for example, the speed controller of the air compressor, to provide the corrected air mass flow to the fuel cell stack.

In the foregoing system, any increase in air compressor speed also results in an increase in the sensed fuel cell current, because of the additional current drawn by the compressor. This results in a positive feedback loop to the PLC's fuel cell current input signal. The positive feedback, in turn, causes a change in the output correction signal that is supplied to the air compressor and causes the speed of the air compressor to change. This in turn causes the sensed fuel cell current to change again, thus rendering the system unstable and causing unnecessary revving of the air compressor.

Another system that describes the control of air flow through a fuel cell stack in response to fuel cell current is set forth in U.S. Pat. No. 5,434,016 issued Jul. 18, 1995, entitled "Process And Apparatus For Supplying Air To A Fuel Cell System", which is incorporated by reference herein in its entirety. This system likewise may be rendered unstable by the influence of the compressor current on the sensed fuel cell current input to the controller.

The present control system and method provides the high dynamic response required in a fuel cell powered vehicle, where the fuel cell power output must react quickly to rapidly changing power demands. Feed-forward control is used to smooth oxidant supply and reduce system instability. Feedback control may also be used to make fine adjustments to the oxidant supply. Adaptive control techniques may be used to adjust subsequent feed-forward control signals in response to varying operating system conditions. Further, in situations where the power demands of the electrical loads exceed the desired maximum fuel cell power output threshold, power management techniques may be used to control and limit the power distribution to the various electrical loads.

SUMMARY OF THE INVENTION

In a method for interrelated control of electrical power output and oxidant supply in a fuel cell electric power generation system, the system comprising a plurality of electrical loads comprising an electric traction motor and a variable-speed compressor, the system further comprising at least one fuel cell stack for supplying electrical power to the electrical loads, the at least one fuel cell stack supplied with a fuel and supplied with an oxidant using the compressor, the electrical power output of the at least one fuel cell stack dependent on the compressor speed, the method comprises summing the instantaneous power demands of the electrical loads, to calculate a total instantaneous power demand, and generating a feed-forward output signal to adjust the compressor speed to a value predicted to give electrical power output sufficient to satisfy the total instantaneous power demand.

The power demands may be summed and the total instantaneous power demand calculated based on sensed signals of power or electric current.

The electrical power output of the at least one fuel cell stack is characterized by a voltage and a current, and the current is dependent on factors comprising the mass flow of the oxidant which is dependent on the compressor speed. Preferably the method further comprises detecting the fuel cell current and the oxidant mass flow and calculating a preferred oxidant mass flow for the detected fuel cell current, and comparing the detected mass flow with the preferred mass flow to generate a feedback compressor speed correction signal.

The correction signal to further may be used to adjust the compressor speed. The correction signal may also be used on a feedback loop to modify the predicted value of the compressor speed, in subsequent iterations of the feed-forward loop, thereby reducing the magnitude of the correction signal in subsequent iterations of step in which the correction signal is generated. Further, the correction signal may be optionally used to modify the compressor speed correction signal in future iterations subsequent iterations of step in which it is generated.

The electrical power output is characterized by a voltage and a current, and the voltage and the current are typically dependent on factors comprising the pressure of the oxidant, wherein the pressure of the oxidant is dependent on the setting of an adjustable throttle valve located downstream of the at least one fuel cell stack, and the mass flow of the oxidant which is dependent on the compressor speed. In a preferred embodiment the method further comprises generating a second feed-forward output signal to adjust the throttle valve setting to a setting predicted to give a preferred oxidant pressure at the predicted compressor speed value. The method may further comprise detecting the oxidant pressure and the oxidant mass flow and calculating a preferred oxidant pressure value for the detected mass flow, and comparing the detected oxidant pressure with the preferred oxidant pressure to generate a feedback pressure correction signal.

The pressure correction signal may be used to further adjust the throttle valve setting. The pressure correction signal may also be used to modify the predicted setting of the throttle valve in subsequent iterations, thereby reducing the magnitude of subsequent pressure correction signals. Further, the pressure correction signal may be used to modify the pressure correction signal in future iterations of the step in which is it generated.

An alternative embodiment of a method for interrelated control of electrical power output and oxidant supply in a fuel cell electric power generation system incorporates management of the response to electrical power demands. The power generation system comprises a plurality of electrical loads comprising an electric traction motor and a variable-speed compressor. The system further comprises at least one fuel cell stack for supplying electrical power to the electrical loads, the at least one fuel cell stack supplied with a fuel and supplied with an oxidant using the compressor. The electrical power output of the at least one fuel cell stack is dependent on the compressor speed. The method comprises summing the instantaneous power demands of the electrical loads, to calculate a total instantaneous power demand, determining a power output threshold, and generating a feed-forward output signal to adjust the compressor speed to a value predicted to give electrical power output sufficient to satisfy the lesser of the total instantaneous power demand and the power output threshold.

Preferably the value of the power output threshold is biased according to the operating temperature of the at least one fuel cell stack, and the detected performance of the at least one fuel cell stack. The performance of the at least one fuel cell stack is measured based on voltage and current measurements.

In one embodiment of a power demand management strategy, when the total instantaneous power demand exceeds the power output threshold, the power demand of the traction motor is only partially satisfied.

In another embodiment of a power demand management strategy, the plurality of loads are characterized as essential and non-essential loads, and when the total instantaneous power demand exceeds the power output threshold, the power demands of the plurality of electrical loads are satisfied, until the power output threshold is reached, by first satisfying the power demand of the compressor, secondly satisfying the power demands of the essential loads, and thirdly satisfying the power demands of the non-essential loads.

In a control system for interrelatedly controlling the electrical power output and oxidant supply in an electric power generation system, the power generation system comprises:

(1) a plurality of electrical loads comprising an electric traction motor and a variable-speed compressor;

(2) at least one fuel cell stack for supplying electrical power to the loads;

(3) a fuel supply for supplying fuel to the at least one fuel cell stack;

(4) an oxidant supply comprising the compressor for supplying an oxidant to the at least one fuel cell stack, wherein the electrical power output of the at least one fuel cell stack is dependent on the compressor speed;

and the control system comprises:

(a) a summing device for determining the total instantaneous power demand of the electrical loads based on a plurality of sensed power demand signals;

(b) a processor for generating a feed-forward output signal for adjusting the compressor speed to a value predicted to give fuel cell power output sufficient to satisfy the total instantaneous power demand.

The electrical power output is characterized by a voltage and a current, and the fuel cell current is dependent on factors comprising the mass flow of the oxidant which is dependent on the compressor speed. In a preferred embodiment the control system further comprises:

(c) a fuel cell current detector and oxidant mass flowmeter;

(d) a device for calculating a preferred oxidant mass flow which is a function of the current detected by the current detector, and for comparing the mass flow detected by the mass flowmeter with the preferred oxidant mass flow, and for generating a feedback compressor speed correction signal.

Preferably the control system further comprises:

(c) an adjustable throttle valve located downstream of the at least one fuel cell stack, for adjusting the pressure of the oxidant in the at least one fuel cell stack;

(d) an oxidant pressure detector;

(e) a device for calculating a preferred oxidant pressure value at the predicted compressor speed value;

(f) a processor for generating a second feed-forward output signal for adjusting the throttle valve to a setting predicted to give the preferred oxidant pressure at the predicted compressor speed value.

An alternative embodiment of a control system for interrelatedly controlling the electrical power output and oxidant supply in the electric power generation system comprises:

(a) a summing device for determining the total instantaneous power demand of the electrical loads based on a plurality of sensed power demand signals;

(b) a processor for comparing the total instantaneous power demand with a power output threshold, and generating a feed-forward output signal for adjusting the compressor speed to a value predicted to electrical power output sufficient to satisfy the lesser of the total instantaneous power demand and the power output threshold.

As used herein the term "dependent" indicates that one variable is a function of another variable, but not does not necessarily indicate a linear interrelationship or proportional dependence of the two variables.

BRIEF DESCRIPTION OF THE DRAWINGS

FIG. 2 is a control system flow diagram illustrating a conventional (prior art) manner of operating the system embodiment of FIG. 1.

FIG. 6 illustrates an additional enhancement to the foregoing system to control and adjust air pressure in the fuel cell stack.

DESCRIPTION OF THE PREFERRED EMBODIMENT

Figure 1:
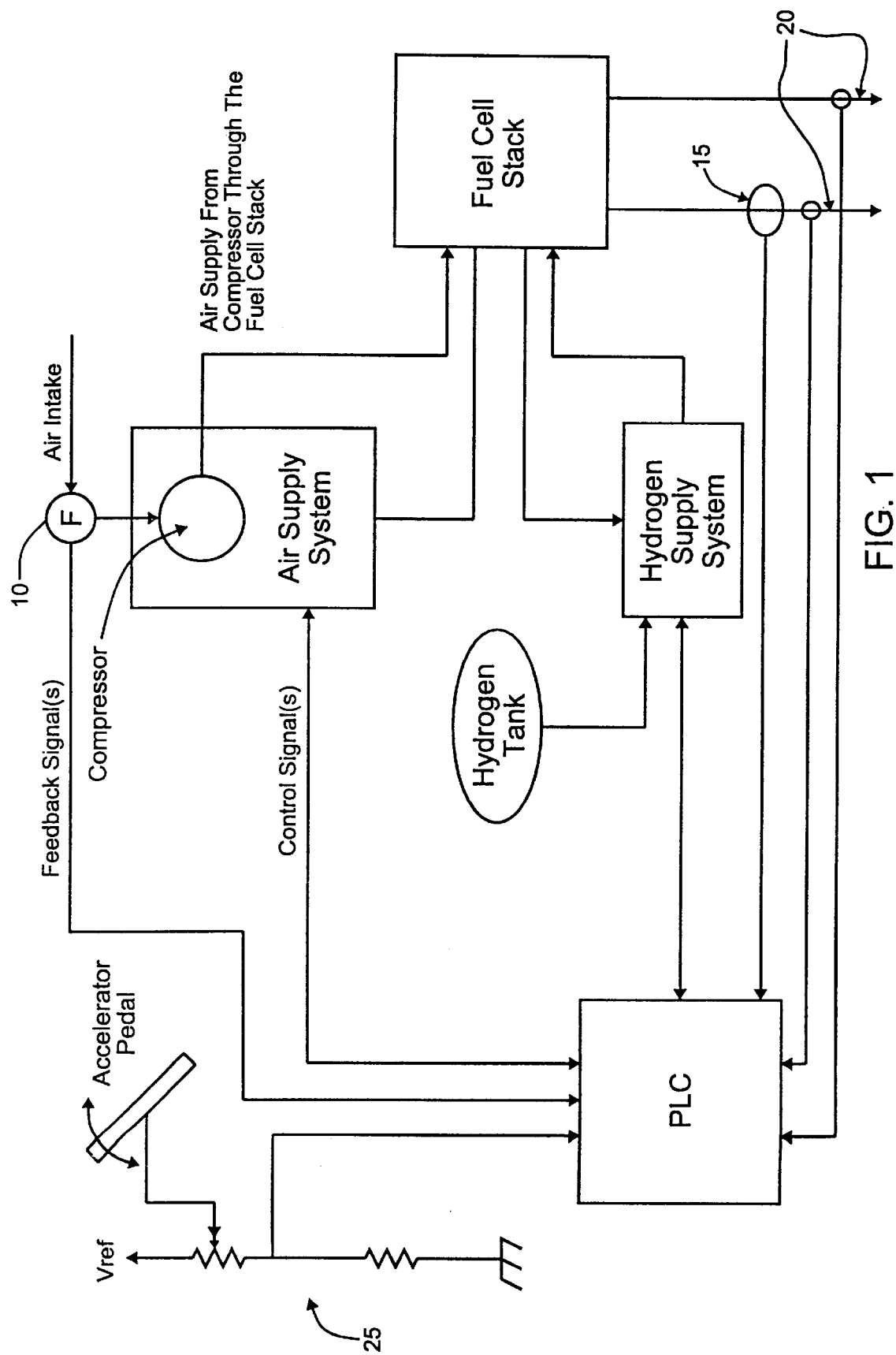
FIG. 1 is a schematic block diagram of one embodiment of a hydrogen and air supply for a fuel cell stack in accordance with the teachings of the prior art.

FIGS. 3A.1, 3A.2, and 3A.3 illustrate one embodiment of hardware that may be employed in a fuel cell powered vehicle with a control system for integrated control of fuel cell power output and the fuel cell oxidant supply. As illustrated, the system, shown generally at 40, includes a programmable logic controller 45 that, for example, may be a PLC that is manufactured and available from General Electric Fanuc or an Allen Bradley Model SLC-500. The PLC 45 receives and supplies signals from and to various electrical systems of the vehicle. Such signals may be either analog, digital, or a hybrid of both analog and digital signals. Input signals to the PLC 45 are shown on the left side of the PLC 45 in FIG. 3A.1, 3A.2, 3A.3 while output signals from the PLC are shown on the right side thereof.

The PLC 45 accepts a plurality of digital switch signals that, for example, are actuated by the vehicle operator to request that the PLC 45 perform certain tasks and operations. Switches 50, 55, 60, and 65 provide an interface for the operator to effectively switch the traction drive between forward, neutral, and reverse, and to initiate running of the vehicle, respectively. The operator initiates a demand for turning the vehicle's air conditioning on or off through switch 70. A demand for turning the vehicle's heating system on or off is initiated by the operator through switch 75. Although the illustrated demand signals are actuated by the operator of the vehicle, such demand signals may also be provided under automatic control. For example, the heating and air conditioning demand signals may be provided as digital signals that are activated automatically by a temperature sensing circuit or the like. Similarly, such signals need not be binary, but may be continuous or have a number of discrete states indicative of the level at which the demanded system is to operate. For example, the heating and cooling systems may have high, medium, and low operating levels, each having different power consumption requirements. In such instances, the signals supplied to the PLC 45 would have the same number of states as the operating levels, e.g., three states each for high, medium, and low level heating and/or cooling operation.

The PLC 45 also receives a plurality of analog signal inputs. These signals include the sensed speed of the electric traction motor as sensed by a traction motor inverter/controller 81, that may be, for example, a Model EI900-W motor inverter that controls, for example, a Model PA44-6W traction motor 83. Both of these components are available from Kaman Electromagnetics Company of Hudson, Mass. The accelerator pedal movement is sensed by the accelerator pedal circuit 25, and the braking effort is sensed, for example, by measuring the pressure with pressure sensor 84 that is applied by the operator to the brake pedal or the fluid pressure that is exerted within the brake air/hydraulic system. The air mass flow to the fuel cell stack is monitored by a mass flow sensor 85.

Figure 3B:
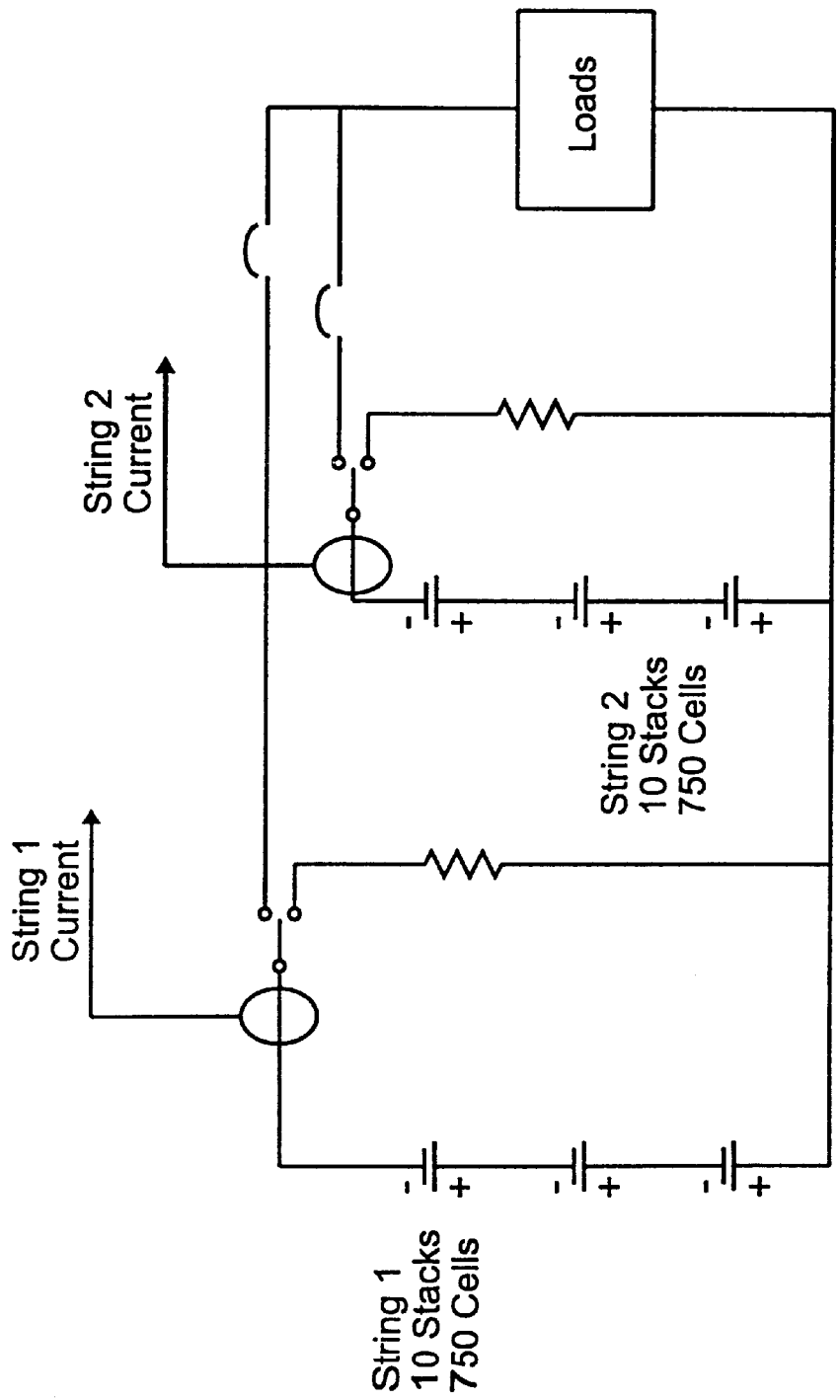
FIGS. 3A.1, 3A.2, 3A.3, and 3B are schematic diagrams of one embodiment of a hardware system in accordance with the teachings of the present invention.

Current drawn from the fuel cell stack is sensed by at least one current sensor. In the illustrated embodiment, two current sensors 90 and 95 are utilized to supply an indication of the fuel cell current to the PLC 45. As shown in FIG. 3B, two current sensors 90, 95 are used because, in the exemplary system, two strings of fuel cell stacks are employed electrically in parallel. The first and second fuel cell stack strings are selectively connected to the loads through actuation of contactors 91. These sensors may be LT-100S LEM modules available from Leister Blake Enterprises, Ltd., of Vancouver, B.C., Canada. The fuel cell string with the greater sensed current is utilized in operation of the present control system. The fuel cell voltage is sensed by a voltage sensor 100 and the resulting signal is supplied to the PLC 45. The voltage sensor may be an LV-100 LEM module available from Leister Blake Enterprises, Ltd. It is to be noted that the foregoing system illustrated in FIG. 3B is exemplary and need not employ such a parallel configuration.

Fan motors, pumps, and baffles associated with the vehicle's cooling system may also be placed under the control of the PLC 45. One such cooling system is described in U.S. patent application Ser. No. 08/473,248 filed Jun. 7, 1995, entitled "Temperature Regulating System For A Fuel Cell Powered Vehicle", which is incorporated herein by reference in its entirety. Pursuant to such operation, the PLC 45 receives signal inputs from one or more temperature sensors 102 that are strategically placed within the cooling system. These temperature signals operate as demand signals from which the PLC determines that there is a need for additional power and allocates the resources necessary to effect supply of that power from the fuel cell stack and actuate the appropriate fans and motors.

In response to these input signals, the PLC 45 supplies a plurality of output signals that are used to control various systems of the vehicle, in particular, to control the air supply system and fuel cell stack power output under varying power demands. Control of the traction motor 83 ensues by providing a torque direction signal 105, a rotation direction signal 110, a traction enable signal 115, and a torque command signal 120 to the traction motor inverter/controller 81 that, in turn, controls the traction motor 83 in response to these received signals. In the illustrated embodiment, signals 105, 110, and 115 are digital signals that are provided to the traction motor inverter/controller 80 through a digital isolator 130, while the torque command signal has undergone A/D conversion within the PLC 45 and is provided to the motor inverter/controller 81 as an analog signal.

The PLC 45 responds to the heating and cooling demands of the operator by providing fan control commands to the cabin fan 121 and pump 122 and by adjusting the appropriate valve to allow heated cooling fluid to flow through, for example, coils disposed proximate the blowing cabin fan. In response to an air conditioning demand by the operator, the PLC 45 may actuate the air conditioning compressor at line(s) 123 and the cabin fan. Such activation of the cabin heating and cooling systems may ensue any number of ways, the foregoing being merely illustrative.

The PLC 45 responds to the demand for cooling system control as indicated by temperatures sensors 102 by providing output control signals 103 to at least a main cooling pump and associated radiator fans.

The PLC 45 also controls the availability of power from the fuel cell stack(s) to power the various electrical systems of the vehicle. The PLC 45 provides the compressor command output signal 126 that is used to control the air mass flow through the fuel cell stack. In the present system, air mass flow is dependent on the speed of an air compressor 128 that is disposed to urge air through the fuel cell stack (see FIG. 1). As such, the compressor command signal 126 is supplied to the air compressor inverter 124 and motor 129, to control the speed of the air compressor 128. The compressor command signal 126 of the instant embodiment is provided as an analog signal, but digital implementation of such a signal is also contemplated. A binary state compressor enable signal 125 may also be provided to enable and disable the compressor. The compressor command signal 126, as well as the other analog signals output from the PLC 45, may be supplied to the respective systems that they control through analog isolators 127.

In situations where the power demands of the electrical loads exceed a desired maximum fuel cell power output threshold, the PLC 45 may be used to control and limit the power distribution to the various electrical loads, according to a predetermined power management strategy. The value of the power output threshold will vary with fuel cell stack operating temperature and with the performance of the stack (as determined by voltage and current measurements). For example, the PLC may refuse to satisfy, or only partially satisfy, the power demands of selected power consuming systems. In particular the PLC output signals may limit the power available to the traction motor and to non-essential loads so that the power output does not exceed the instantaneous power output threshold.

Figure 4:
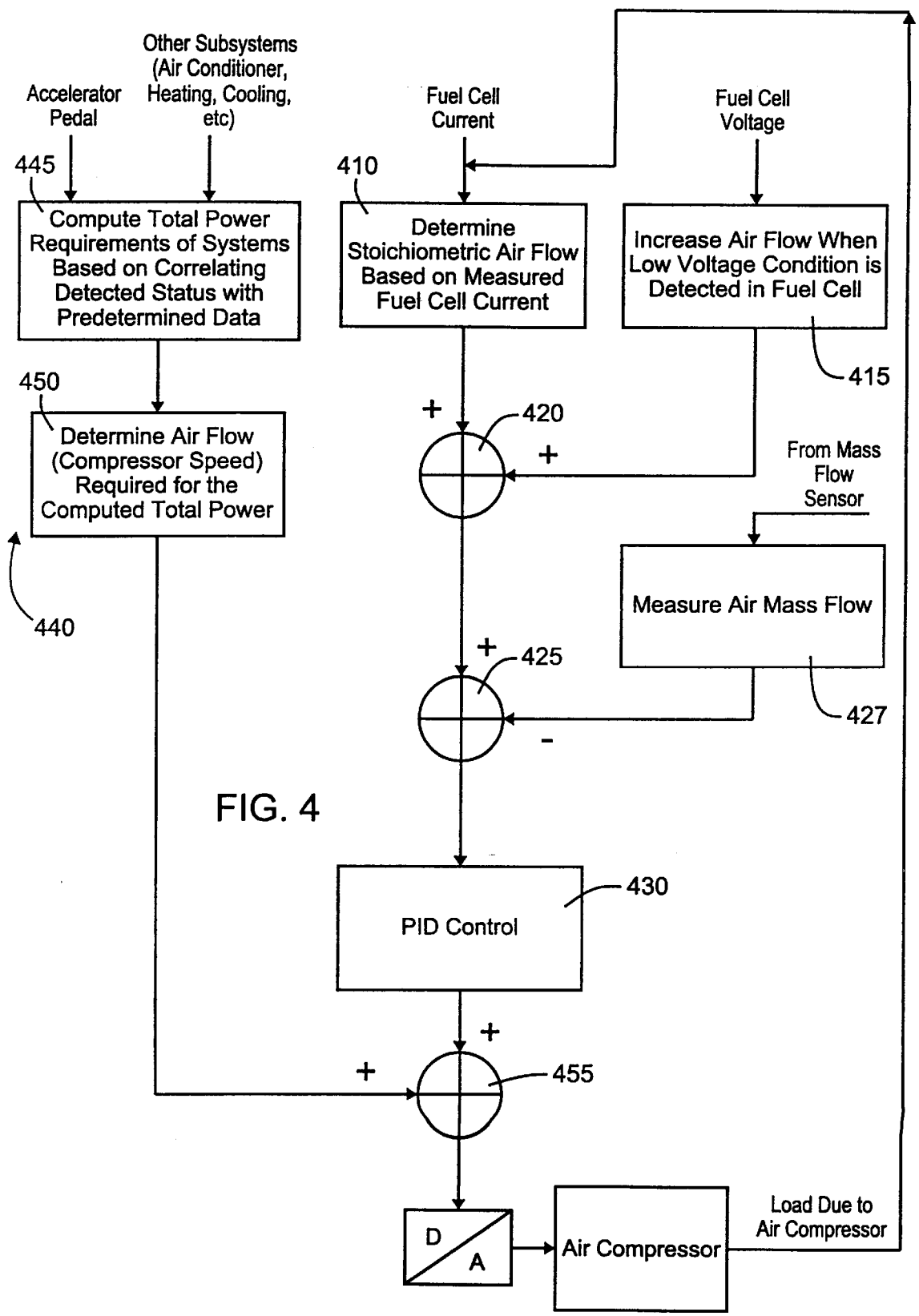
FIG. 4 is a control system flow diagram illustrating one manner of controlling operation of the system of FIGS. 3A and 3B.

The method of controlling operation of the foregoing hardware system may be described with reference to FIG. 4. FIG. 4 is a control system flow diagram illustrating operation of the PLC 45 and its response to various input signals and its control of air compressor 128. As will be readily understood, the disclosed operational steps may be implemented in software code that is stored, for example, in the memory components of the PLC 45, and by the appertaining hardware circuitry.

As illustrated, a measurement of the actual fuel cell stack current is used at step 410 to determine the preferred air mass flow to be supplied to the fuel cell stack to maintain the power output from the fuel cell stack at the measured level. This determination of the preferred air mass flow can be made by using the fuel cell stack current in a mathematical equation or by employing a look-up table that uses the measured fuel cell stack current value to look-up the value of the preferred air mass flow. Such methods of determining an output value from a sensed input value are common and, as will be clear from the following discussion, may be used in connection with many of the various determinations and calculations used in the present system. Additionally, the fuel cell stack voltage is measured at step 415 and compared to a minimum threshold value, below which the system determines that an additional increase in air mass flow is required, or that power provided in response to demands from various system loads is to be reduced. The calculated preferred air mass flow and any increase necessitated by a low voltage condition are combined, for example, summed, by a summer at step 420. The resulting signal is compared at step 425 with the actual air mass flow measured at step 427 by mass flow sensor 85 to generate an error signal that, in turn, is supplied, for example, to a PID control 430.

The PID control 430 provides an output feedback correction signal value that adjusts the compressor speed in accordance with the corrected required air mass flow. If the compressor speed were to be adjusted based only on this feedback value, the compressor speed would tend to be difficult to control due to the loading effect that the compressor has upon the measured fuel cell stack current provided to the system at step 410. To counteract this loading effect, a feed-forward system, shown generally at 440 is utilized. The feed-forward system 440 accepts position information from the accelerator pedal indicative of the power demanded by the traction motor and, further, receives signals indicative of the status of other electrical loads in the system and their power demands at step 445. The input signals can be based on sensed power or current demands. The total power (or current) demand of these systems is then calculated at step 445 using the input signals.

Pedal position is used to determine whether the vehicle operator is instructing the vehicle to accelerate, decelerate, or remain at the current vehicle speed. The pedal position and its movement over time are used to determine how much power the traction motor will need to respond to the vehicle operator's instruction. Temperature sensor signals indicate whether power to the cooling system is required. The status signals may be simple binary state signals (on/off) indicating that a particular power consuming system is either on or off. Alternatively, these signals may be multiple bit signals or analog signals which indicate the power consuming state of the particular system. The power consuming systems may include, for example, the air conditioning system, the fuel cell stack cooling system, etc. The power demanded by each system is calculated based on the detected status of the respective system. This calculation can be made by employing the detected status information in a predetermined mathematical equation or by using the status information as a look-up indicator in a look-up table. In each instance, the correlation between the status information and the calculated power demand is based on a predetermined correlation that has been, for example, determined empirically.

The total net power requirements determined at step 445 are then used at step 450 to calculate the air mass flow predicted to satisfy the total power demand. The resulting calculation is combined at step 455 with the required air mass flow value determined by the PID control 430. In the illustrated embodiment, the values are summed together at step 455. Other combining operations may be utilized as well.

The combined signal resulting from step 455 is used to control the speed of the air compressor 128 by, for example, providing for a digital-to-analog conversion of the signal. Since the signal effectively supplied to the compressor 128 is a combination of a signal resulting from a feedback path (i.e., resulting from an error signal based on the fed back measured air mass flow) as well as a signal resulting from the feed-forward path 440, the compressor will remain generally stable without, for example, the revving characteristic of prior systems.

Figure 5:
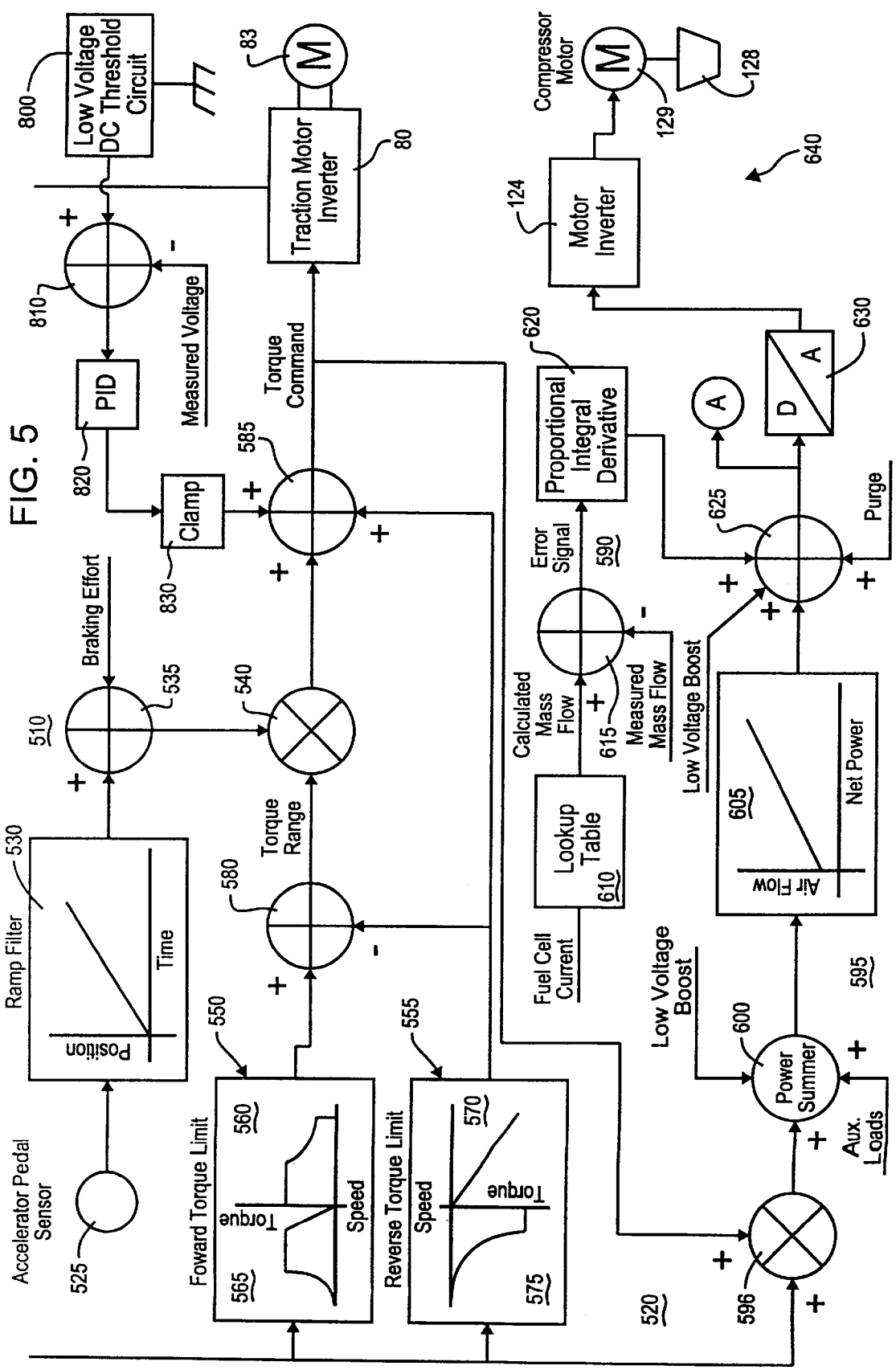
FIG. 5 illustrates a further detailed embodiment of a control system utilizing both feedback and feed-forward control of the compressor.

FIG. 5 illustrates a further detailed embodiment of a control system utilizing both feedback and feed-forward processes to control the speed of the air compressor and, as a result, the air mass flow to the fuel cell stack and fuel cell power output. Generally stated, the control system of FIG. 5 includes a torque control system 510 and an air supply control system 520. The torque control system 510 senses the accelerator pedal position, indicative of the traction motor power demand, at step 525 and provides a digital representation of the position to a ramp filter 530. The output of the ramp filter 530 is added in summer 535 with a digital value representative of the regenerative braking effort applied to the vehicle by the vehicle operator. The regenerative braking effort value represents the braking effort that the vehicle operator is applying to slow or stop the vehicle and can be determined from the pressure applied to the brake in the vehicle cabin, the pressure of the brake fluid in the hydraulic system, etc. The resulting sum is supplied as one operand of multiplier 540.

Multiplier 540 also receives a digital torque range value as another operand. The digital torque range value limits the upper torque command values that are applied to the traction motor inverter/controller 80 for use in controlling the traction motor 83. The limit is determined from the sensed speed of the traction motor which is fed back to a forward torque limit table 550 and a reverse torque limit table 555. The speed value is used as an operand in the limit tables to determine the torque range limits based on whether the torque value is in a direction to drive the vehicle in a forward direction (forward torque limit table 550) or in a reverse direction (reverse torque limit table).

The forward torque limit table includes a quadrant 560 wherein the torque and speed are positive and quadrant 565 wherein the torque limit is positive and the speed is negative. Quadrant 560 is operative when the vehicle is accelerating or at a constant speed while proceeding in the forward direction. Quadrant 565 is operative when the vehicle is proceeding in the reverse direction but is slowing down in that direction.

The reverse torque limit table includes a quadrant 570 wherein the speed is positive and the torque is negative and a quadrant 575 wherein the speed and torque are negative. Quadrant 575 is operative when the vehicle is accelerating or at a constant speed while proceeding in the reverse direction. Quadrant 570 is operative when the vehicle is proceeding in the forward direction but is slowing down in that direction.

For a given speed value, the forward torque value limit and reverse torque value limit are summed in a summer 580 to generate the torque range value. As previously noted, the torque range value is supplied as an operand to multiplier 540 where it is multiplied by the value output from summer 535. The effect of the multiplication is to select where the torque command value is to be within the range of torque values. The resulting value is supplied to a summer 585 where it is added to the value of the reverse torque limit. The output of summer 585 is the torque command value that sets the torque of the traction motor 83 that is to be applied by the traction motor inverter/controller 80.

The air control system 520 includes a feedback portion, generally designated at 590, and a feed-forward portion, generally designated at 595. The feed-forward portion 595 accepts the actual speed value from the traction motor inverter/controller 80 and multiples that value by the torque command value in a multiplier 596. The resulting signal represents the power demanded by the traction motor 83. The traction motor power demand is then added to the power demands of other power consuming systems of the vehicle in a power summer 600. The output of power summer 600 has a value representing the total net power demand that is placed on the fuel cell stack. The net power demand is used in a look-up table 605 to determine the predicted air mass flow required by the fuel cell stack to meet the total power demand. As is readily apparent, the net power value can also be supplied as an input to a mathematical equation to calculate the requisite air mass flow. As noted above, the air mass flow output value from the feed-forward portion 595 is based on the calculated net power demanded by the system which, in turn, is based on the sensed status of those systems.

The feedback portion 590 accepts the sensed fuel cell stack current value and calculates the preferred air mass flow required by the fuel cell stack at that current using a look-up table 610. The calculated preferred air mass flow is then supplied to the input of a summer 615 where it is compared with the measured air mass flow value that is sensed by mass flow sensor 85. The output of the summer 615 is an error signal value that is applied to the input of a PID control 620. The output correction signal of the PID control 620 is added to the calculated output of look-up table 605 by summer 625 to generate a corrected air mass flow value and corresponding air control command value that is supplied to the input of a digital-to-analog (D/A) converter 630 which converts the air control command value to an analog signal that drives the compressor motor and appertaining circuitry at the speed necessary to provide the fuel cell stack with the appropriate air mass flow.

The error signal generated at 615 at a particular net power demand may optionally be used to fine-tune the feed-forward portion 595, to allow more rapid response and to smooth the air supply response further. The tuner 650 may modify the look-up table 605 directly, or as illustrated, may apply a correction to modify the output from table 605 at summer 660, and thereby adjust the feed-forward path output at 625 in subsequent iterations of the feed-forward loop.

Also, the error signal generated at 615, and optionally other input signals, may be used to tune the feedback portion 590 using adaptive control device 670 which modifies the gain of PID controller 620, and thereby reduces the magnitude of the output correction signal of PID control 620 in subsequent iterations of the feedback loop. This, and other similar adaptive control techniques, can be used to improve system stability and smooth the air supply.

It may be desirable to provide the foregoing system with some manner of compensating for a fuel cell undervoltage condition. To this end a comparison may be made in a software or hardware comparator between the sensed fuel cell voltage and a first low voltage threshold value. If the measured value of the fuel cell voltage falls below the first threshold value, the comparator output may be used to increase the air mass flow/compressor speed. To this end, such a bias may be applied to either the feed-forward or feedback paths which increases the resulting compressor speed upon the detection of the low voltage output condition of the comparator. For example, such a bias may be supplied to the input of the power summer 600 or as an input that is combined with the PID 620 output and feed-forward path output at 625.

A low voltage condition may also be compensated by reducing the load on the fuel cell. For example, the PLC may refuse to satisfy, or only partially satisfy, the power demands of selected power consuming systems. Additionally, the torque command applied to the traction motor inverter/controller 80 may be reduced by an amount sufficient to ensure that the fuel cell voltage does not proceed to an inoperable level. To this end, a second low voltage threshold is generated at component 800 and supplied to summer 810 where it is compared to the measured fuel cell voltage. The output of summer 810 is supplied to a PID control 820 which generates a torque bias signal to a clamp 830. Clamp 830 ensures that the upper limit of the PID output is less than or equal to zero. The clamped signal is then applied to summer 585 to reduce the torque of the traction motor and, thus, the overall load on the fuel cell. Preferably, the second low voltage threshold value is less than the first low voltage threshold value.

FIG. 6 illustrates an additional enhancement to the foregoing control system to control the pressure of the air supply to the fuel cell stack. This system can be used either alone or in conjunction with the previously described system.

The system enhancement of FIG. 6 is designed to regulate the air pressure within the fuel cell stack as a function of air mass flow, or independently of mass air mass flow, to thereby enhance the fuel cell system performance. As shown, a motorized throttle valve 700 that is controlled by a stepper motor controller 710 is disposed downstream of the fuel cell stack. A pressure sensor 715 is disposed to measure the pressure of the air at the inlet to the fuel cell stack.

Air mass flow, as noted above, is dependent on the speed of the compressor in the illustrated embodiment. Therefore, the compressor speed command value calculated by the PLC 45 is used as an input to the illustrated system to control the stepper motor controller 710 which, in turn, controls the degree to which the motorized throttle valve 700 is opened or closed. Other means for determining the compressor speed/mass flow may be utilized as well.

The compressor speed command value is provided to the input of a feedback path 717 where it is used, for example, by a look-up table 720, to select the preferred pressure for the given air mass flow/compressor speed. The selected pressure is then compared at 725 with the actual pressure as sensed by pressure sensor 715 to generate an error signal that, in turn, is supplied to PID 730 for processing. The output of the PID 730 represents the correction to the position of the stepper motor controller 710, and thus throttle valve 700, required to obtain the preferred pressure at the fuel cell inlet.

The output of the PID 730 is combined with the output of a feed-forward path 735. The feed-forward path accepts the compressor speed/air mass flow value and uses the value, for example, in look-up table 740 where it is used as an operand to calculate the required stepper motor position to cause the throttle valve 700 to give the desired air pressure. This calculation, in feed-forward path 735, is based on empirically determined values and does not involve a comparison with the sensed pressure value. The resulting value is combined with the correction value from the PID in summer 745. The combined value is provided to the stepper motor controller 710 to control the motorized throttle valve 700.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for interrelated control of electrical power output and oxidant supply in a fuel cell electric power generation system, the system comprising a plurality of electrical loads comprising an electric traction motor and a variable-speed compressor, the system further comprising at least one fuel cell stack for supplying electrical power to the electrical loads, the at least one fuel cell stack supplied with a fuel and supplied with an oxidant using the compressor, the electrical power output of the at least one fuel cell stack dependent on the compressor speed, said method comprising:

(a) summing the instantaneous power demands of said electrical loads, to calculate a total instantaneous power demand;

(b) generating a feed-forward output signal to adjust said compressor speed to a value predicted to give electrical power output sufficient to satisfy said total instantaneous power demand.

2. The method of claim 1, wherein said electrical power output is characterized by a voltage and a current, and said current is dependent on factors comprising the mass flow of said oxidant which is dependent on said compressor speed, said method further comprising:

(c) detecting said fuel cell current and said oxidant mass flow;

(d) calculating a preferred oxidant mass flow for said detected fuel cell current, and comparing said detected mass flow with said preferred mass flow to generate a feedback compressor speed correction signal.

3. The method of claim 2 further comprising using said correction signal to further adjust said compressor speed.

4. The method of claim 2 further comprising using said correction signal to modify said predicted value of said compressor speed, in subsequent iterations of steps (a)–(b), thereby reducing the magnitude of said correction signal in subsequent iterations of steps (c)–(d).

5. The method of claim 2 further comprising using said correction signal to modify said compressor speed correction signal in subsequent iterations of steps (d).

6. The method of claim 1, wherein said electrical power output is characterized by a voltage and a current, and said voltage and said current are dependent on factors comprising:

(1) the pressure of said oxidant, wherein the pressure of said oxidant is dependent on the setting of an adjustable throttle valve located downstream of said at least one fuel cell stack, and (2) the mass flow of said oxidant which is dependent on said compressor speed;

said method further comprising:

(e) generating a second feed-forward output signal to adjust said throttle valve setting to a setting predicted to give a preferred oxidant pressure at said predicted compressor speed value.

7. The method of claim 6 further comprising:

(f) detecting said oxidant pressure and said oxidant mass flow;

(g) calculating a preferred oxidant pressure value for said detected mass flow, and comparing said detected oxidant pressure with said preferred oxidant pressure to generate a feedback pressure correction signal.

8. The method of claim 7 comprising using said pressure correction signal is used to further adjust said throttle valve setting.

9. The method of claim 7 further comprising using said pressure correction signal to modify said predicted setting of said throttle valve in subsequent iterations of step (e), thereby reducing the magnitude of said pressure correction signal in subsequent iterations of steps (f)–(g).

10. The method of claim 7 further comprising using said pressure correction signal to modify said pressure correction signal in subsequent iterations of steps (f)–(g).

11. A method for interrelated control of electrical power output and oxidant supply in a fuel cell electric power generation system, the system comprising a plurality of electrical loads comprising an electric traction motor and a variable-speed compressor, the system further comprising at least one fuel cell stack for supplying electrical power to the electrical loads, said at least one fuel cell stack supplied with a fuel and supplied with an oxidant using the compressor, the electrical power output of the at least one fuel cell stack is dependent on the compressor speed, said method comprising:

(a) summing the instantaneous power demands of said electrical loads, to calculate a total instantaneous power demand;

(b) determining a power output threshold;

(c) generating a feed-forward output signal to adjust said compressor speed to a value predicted to give electrical power output sufficient to satisfy the lesser of said total instantaneous power demand and said power output threshold.

12. The method of claim 11 wherein the value of said power output threshold is biased according to the operating temperature of said at least one fuel cell stack, and the detected performance of said at least one fuel cell stack.

13. The method of claim 12 wherein when said total instantaneous power demand exceeds said power output threshold, the power demand of said traction motor is only partially satisfied.

14. The method of claim 12 wherein said plurality of loads further comprises essential and non-essential loads, and when said total instantaneous power demand exceeds said power output threshold, the power demands of said plurality of electrical loads are satisfied, until said power output threshold is reached, by first satisfying the power demand of said compressor, secondly satisfying the power demands of said essential loads, and thirdly satisfying the power demands of said non-essential loads.

15. A control system for interrelatedly controlling the electrical power output and oxidant supply in an electric power generation system, said power generation system comprising:

(1) a plurality of electrical loads comprising an electric traction motor and a variable-speed compressor;

(2) at least one fuel cell stack for supplying electrical power to said loads;

(3) a fuel supply for supplying fuel to said at least one fuel cell stack;

(4) an oxidant supply comprising said compressor for supplying an oxidant to said at least one fuel cell stack, wherein the electrical power output of said at least one fuel cell stack is dependent on said compressor speed;

said control system comprising:

(a) a summing device for determining the total instantaneous power demand of said electrical loads based on a plurality of sensed power demand signals;

(b) a processor for generating a feed-forward output signal for adjusting the compressor speed to a value predicted to give fuel cell power output sufficient to satisfy said total instantaneous power demand.

16. The control system of claim 15, wherein said electrical power output is characterized by a voltage and a current, and said fuel cell current is dependent on factors comprising the mass flow of said oxidant which is dependent on said compressor speed, said control system further comprising:

(c) a fuel cell current detector and oxidant mass flowmeter;

(d) a device for calculating a preferred oxidant mass flow which is a function of said current detected by said current detector, and for comparing the mass flow detected by said mass flowmeter with said preferred oxidant mass flow, and for generating a feedback compressor speed correction signal.

17. The control system of claim 15 further comprising:

(c) an adjustable throttle valve located downstream of said at least one fuel cell stack, for adjusting the pressure of said oxidant in said at least one fuel cell stack;

(d) an oxidant pressure detector;

(e) a device for calculating a preferred oxidant pressure value at said predicted compressor speed value;

(f) a processor for generating a second feed-forward output signal for adjusting said throttle valve to a setting predicted to give said preferred oxidant pressure at said predicted compressor speed value.

18. A control system for interrelatedly controlling the electrical power output and oxidant supply in an electric power generation system, said power generation system comprising:

(1) a plurality of electrical loads comprising an electric traction motor and a variable-speed compressor;

(2) at least one fuel cell stack for supplying electrical power to said loads;

(3) a fuel supply for supplying fuel to said at least one fuel cell stack;

(4) an oxidant supply comprising said compressor for supplying an oxidant to said at least one fuel cell stack, wherein the electrical power output of said at least one fuel cell stack is dependent on said compressor speed;

said control system comprising:

(a) a summing device for determining the total instantaneous power demand of said electrical loads based on a plurality of sensed power demand signals;

(b) a processor for comparing said total instantaneous power demand with a power output threshold, and generating a feed-forward output signal for adjusting said compressor speed to a value predicted to electrical power output sufficient to satisfy the lesser of said total instantaneous power demand and said power output threshold.

* * * * *